United States Patent
Agarwal et al.

(10) Patent No.: US 12,013,879 B2
(45) Date of Patent: Jun. 18, 2024

(54) DYNAMIC RESOLUTION ESTIMATION IN METRIC TIME SERIES DATA

(71) Applicant: SPLUNK Inc., San Francisco, CA (US)

(72) Inventors: Nishant Agarwal, San Jose, CA (US); Houwu Bai, San Jose, CA (US); Darshan Patel, Sunnyvale, CA (US); Rajesh Raman, Palo Alto, CA (US); Joseph Ari Ross, Redwood City, CA (US)

(73) Assignee: SPLUNK Inc., San Francisco, CA (US)

( * ) Notice: Subject to any disclaimer, the term of this patent is extended or adjusted under 35 U.S.C. 154(b) by 27 days.

(21) Appl. No.: 17/721,248

(22) Filed: Apr. 14, 2022

(65) Prior Publication Data
US 2023/0118988 A1 Apr. 20, 2023

Related U.S. Application Data

(60) Provisional application No. 63/256,916, filed on Oct. 18, 2021.

(51) Int. Cl.
*G06F 16/2458* (2019.01)
*G06F 16/2455* (2019.01)
(Continued)

(52) U.S. Cl.
CPC ...... *G06F 16/287* (2019.01); *G06F 16/24568* (2019.01); *G06F 16/2477* (2019.01); *H04L 43/08* (2013.01)

(58) Field of Classification Search
CPC .............. G06F 16/2477; G06F 16/287; G06F 16/24568; H04L 43/08
See application file for complete search history.

(56) References Cited

U.S. PATENT DOCUMENTS

| 7,937,344 B2 | 5/2011 | Baum et al. |
| 8,112,425 B2 | 2/2012 | Baum et al. |

(Continued)

FOREIGN PATENT DOCUMENTS

| EP | 2560106 A1 * | 2/2013 | ....... G06F 16/24568 |
| WO | WO-2016202884 A1 * | 12/2016 | ....... H04N 21/21805 |

OTHER PUBLICATIONS

Splunk Enterprise 8.0.0 Overview, available online, retrieved May 20, 2020 from docs.splunk.com.
(Continued)

*Primary Examiner* — Apu M Mofiz
*Assistant Examiner* — J Mitchell Curran
(74) *Attorney, Agent, or Firm* — Kilpatrick Townsend & Stockton LLP

(57) ABSTRACT

Described are systems, methods, and techniques for collecting, analyzing, processing, and storing time series data and for evaluating and dynamically estimating a resolution of one or more streams of data points and updating an output resolution. Responsive to receiving a stream of data points, a data resolution can be derived and an output resolution can be set to a first value. When a change to the data resolution is detected, the output resolution can be changed, modifying a frequency at which output data points are generated and/or transmitted. In some instances, a detector can be implemented to trigger an alert responsive to ingested data points corresponding with triggering parameters. An output resolution for the detector can be dynamically modified based on dynamically detecting a change to the data resolution of the stream of data.

20 Claims, 9 Drawing Sheets

(51) Int. Cl.
G06F 16/28 (2019.01)
H04L 43/08 (2022.01)

(56) References Cited

U.S. PATENT DOCUMENTS

| | | | |
|---|---|---|---|
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 10,305,758 | B1 * | 5/2019 | Bhide ................. G06F 11/3409 |
| 10,409,817 | B1 | 9/2019 | Dias et al. |
| 10,712,903 | B2 | 7/2020 | Mackinlay et al. |
| 11,886,464 | B1 | 1/2024 | Oliner et al. |
| 2005/0188263 | A1 | 8/2005 | Gross et al. |
| 2013/0262035 | A1 | 10/2013 | Mills et al. |
| 2015/0134586 | A1 | 5/2015 | Chen et al. |
| 2016/0179488 | A1 | 6/2016 | Raman et al. |
| 2017/0317874 | A1 | 11/2017 | Borah |
| 2018/0088813 | A1 * | 3/2018 | Agrawal ........... G06F 16/24561 |
| 2018/0324199 | A1 | 11/2018 | Crotinger et al. |
| 2018/0349482 | A1 | 12/2018 | Oliner et al. |
| 2019/0098106 | A1 | 3/2019 | Mungel et al. |
| 2019/0102276 | A1 | 4/2019 | Dang et al. |
| 2019/0129821 | A1 | 5/2019 | Lee et al. |
| 2019/0146978 | A1 * | 5/2019 | Beedgen ............... G06F 16/258 707/754 |
| 2019/0236177 | A1 | 8/2019 | Jain et al. |
| 2019/0266164 | A1 | 8/2019 | Singh et al. |
| 2020/0162407 | A1 | 5/2020 | Tillotson |
| 2021/0004376 | A1 | 1/2021 | Rawal et al. |
| 2021/0109949 | A1 * | 4/2021 | Zbarsky .............. G06F 16/2471 |
| 2021/0194783 | A1 * | 6/2021 | Sinha .................. H04L 43/0864 |
| 2022/0121983 | A1 | 4/2022 | Jagota |
| 2022/0263840 | A1 * | 8/2022 | Ros-Giralt ........ G06F 16/90344 |
| 2022/0292074 | A1 | 9/2022 | Zhang et al. |
| 2022/0300502 | A1 | 9/2022 | Enver et al. |
| 2023/0120313 | A1 | 4/2023 | Agarwal et al. |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.
PCT/US2022/046660 , "Invitation to Pay Additional Fees and, Where Applicable, Protest Fee", dated Feb. 16, 2023, 17 pages.
PCT/US2022/046660 , "International Search Report and Written Opinion", dated Apr. 6, 2023, 22 pages.

* cited by examiner

DYNAMIC RESOLUTION ESTIMATION IN METRIC TIME SERIES DATA

RELATED APPLICATIONS

This application claims the benefit of and priority to U.S. Provisional Patent Application No. 63/256,916, titled "DYNAMIC RESOLUTION ESTIMATION IN METRIC TIME SERIES DATA," and filed on Oct. 18, 2021, the entirety of which is incorporated by reference herein.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data").

In some examples, machine data may be generated by software or based on physical parameters associated with a computing system on which the software is operating. For example, machine data can include log data, performance data, diagnostic data, metrics, tracing data, or any other data that can be analyzed to diagnose equipment performance problems, monitor user interactions, and to derive other insights.

Monitoring certain machine data in real-time or near real-time may be desirable for some applications. For example, it may be useful to monitor performance data or metrics, such as processor usage or memory usage, in real-time to allow for identification of problems as they occur. Tracking machine data in real-time or over various time periods (e.g., hours, days, weeks, months) can also allow for identification of patterns and can be useful for scaling resources, for example. In some cases, it can be useful to consolidate or compile machine data generated in real-time (e.g., every second) over longer periods (e.g., minutes, hours, days, etc.) to allow for easier visualization and interpretation or analysis of the machine data.

BRIEF DESCRIPTION OF THE DRAWINGS

Illustrative examples are described in detail below with reference to the following figures.

DETAILED DESCRIPTION

Figure 1:
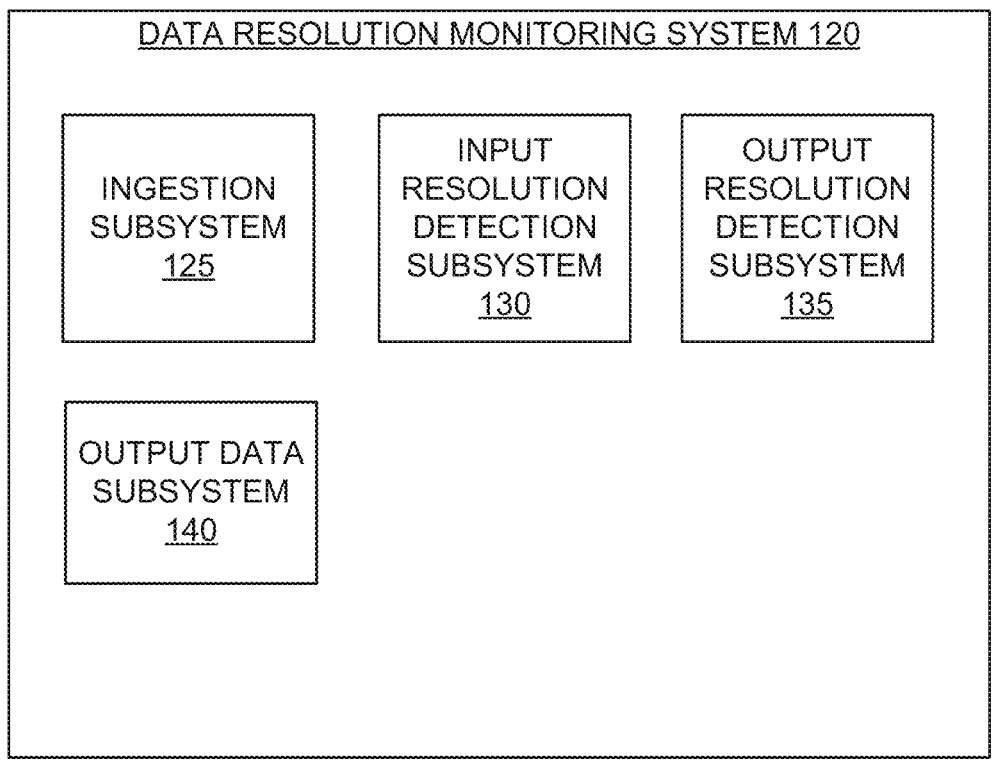
FIG. 1 shows an overview of an example data resolution monitoring system.

The present embodiments generally relate to a dynamic resolution estimation of metric time series data. Particularly, metric time series data can be processed to determine whether a resolution of the metric time series data has been modified. For instance, a majority symbol algorithm can process data points in the metric time series data and modify a bit set of an object when the resolution of the metric time series data changes. The present embodiments can efficiently process metric time series data with a low amount of computing resources required to process multiple metric time series for multiple jobs.

For example, a stream of data points can be obtained at a data resolution monitoring system. The stream of data points can include one or more pluralities of data points that are received at a data resolution. The data resolution can correspond to an inter-arrival time between the data points in the first plurality of data points.

An output resolution can be set to a first value, and a first set of output data points can be generated based upon the data points in the first plurality of data points received via the stream of data points. The first set of output data points can be outputted at the first value. The first value can represent a time between the data points in the first set of output data points being output from the data resolution monitoring system.

The stream of data points can be monitored to detect a change in the data resolution of the data points received via the stream. For instance, it can be detected that the data resolution changes from the first data resolution to a second data resolution that is different from the first data resolution. After detecting the change in data resolution for the stream of data points from the first data resolution to the second data resolution, the output resolution can be set to a second value and a second set of output data points can be generated based upon the data points in a second plurality of data points received via the stream of data points. The second set of output data points can be outputted according to the second value. The second value represents a time between the data points in the second set of output data points being output.

Embodiments described herein are useful for analyzing, visualizing, organizing, or otherwise using machine data, such as for purposes of determining the state or condition of a system. For example, machine data can be raw machine data that is generated by various components in IT environments, such as servers, sensors, routers, mobile devices, Internet of Things (IoT) devices, etc. Machine data can include log data, network packet data, sensor data, application program data, error log data, stack trace data, performance data, metrics, tracing data, diagnostic data, and many other types of data.

The machine data may be organized as time series data, where each data point may have or be associated with one or more times or timestamps, such as a raw time, a receipt time, a publication time, etc., one or more values, such as a numerical measurement that can change over time (e.g., processor usage, network latency, total transactions or transactions per unit time, etc.), and optionally metadata, such as one or more identifiers, dimensions, tags, labels, or other custom properties that may indicate characteristics of or associated with the data that may or may not change over time (e.g., a metric name or metric type of the data point, a server IP address or hostname, etc.). In some implementations, a set of time series data associated with the same metric name and dimensions may be referred to as a metric time series or MTS. Metric time series and other time series data may be used for various applications, such as for identification of patterns or anomalies.

Metric time series data points can be obtained from a client device in performance of a job. For example, a job can include processing data points via various services to derive insights into the data (e.g., anomalous data in the metric time series data) or generate near real time graphical representations of the metric time series data.

Further, the client can transmit the metric time series data points at specific intervals. The interval at which data points are provided can be referred to as an inter-arrival time. For example, a client can send data points at an interval of 10 seconds, 1 minute, 1 hour, etc. The interval at which the metric time series data points are provided from the client can be based on any of a variety of factors, such as computing resources available to the client, a type of job for the metric time series data, etc.

Additionally, at the start of a job, an output resolution can be derived specific to the job and the inter-arrival time of the data points. For example, for a job providing a graphical representation of a processed attribute of the metric time series data over a period of multiple weeks, the output resolution can comprise 1 hour, specifying that the resolution of the processed attribute is generated for the graphical representation every hour. The output resolution can also be derived based on internal thresholds to maintain computational efficiency in performance of the job.

In some instances, the inter-arrival time of metric time series data points may remain unchanged for the duration of the job. However, in many instances, the inter-arrival time of metric time series data points may change during the duration of the job. For example, the client may desire a finer resolution of processed data and may decrease the interval at which data points are provided for the job. As another example, the client can increase the interval at which data points are provided for the job to decrease computational resources used by a client computer.

In many cases, the static output resolution initially derived at the start of the job may not account for any modifications to the resolution of the metric time series data. This may result in no modification to the output resolution and no change in the data provided to the client (e.g., in a graphical representation to the client) despite the resolution of the metric time series data being modified. For example, an alert specific to a job may not be triggered for metric time series data due to the output resolution not modifying with the resolution of the metric time series data.

The present embodiments generally relate to a dynamic resolution estimation of metric time series data. Particularly, metric time series data can be processed to determine whether a resolution of the metric time series data has been modified. For instance, a majority symbol algorithm can process data points in the metric time series data and modify a bit set of an object when the resolution of the metric time series data changes. The present embodiments can efficiently process metric time series data with a low amount of computing resources required to process multiple metric time series for multiple jobs.

Responsive to detecting the modification of the resolution of the metric time series data, a modified output resolution can be derived for performance of the job based on the modified resolution. Dynamically identifying a change in a resolution of metric time series data and modifying an output resolution can efficiently capture insights in the metric time series data by taking into account the data provided in the modified resolution of the metric time series data.

1.0. Data Stream Processing

FIG. 1 shows an overview of an example data resolution monitoring system 120. Time series data may be generated in real time by various data sources, which may be distributed across various networks. These data sources may transmit the time series data to a data resolution monitoring system 120, such as over a network, which may include a private network, a wide area network, or a public network (e.g., the Internet). In some cases, the data resolution monitoring system 120 may be at a location remote from the data sources, though in some cases the data resolution monitoring system 120 and one or more data sources may be at a common location, and optionally on the same local network. The time series data may include data points that are generated on a repeated basis, which may be a periodic basis (e.g., every second, every minute, etc.) or on a non-periodic basis (e.g., when a generation threshold is reached, upon system reboot, etc.). As illustrated, the data resolution monitoring system 120 may include various subsystems or components, such as an ingestion subsystem 125, an input resolution detection subsystem 130, an output resolution detection subsystem 135, and/or an output data subsystem 140.

The data sources may be any suitable computing devices, sensors, software systems, etc., that can generate or collect machine data or other data and transmit the machine data or other data in the form of time series data, such as over one or more network connections. The data sources can include hosted or containerized software or services operating on cloud infrastructure, where computing resources are shared between multiple hosted software or services. The data sources can be present in a single location or data center or distributed among various data centers, which may be located remotely from one another.

The time series data generated by the data sources may include data points that are associated with raw times, which can correspond to timestamps indicating when a data point is generated by a data source, a time at which a data point is transmitted by a data source, or some other time assigned to the data point by the data source.

The data resolution monitoring system 120 may ingest or intake the time series data using the ingestion subsystem 125. The ingestion subsystem 125 can receive the time series data from the data sources and assign a receipt time to the data points in the time series data based on a time at which the data points are received, which is generally different from the raw time associated with the data points, since there is usually some latency associated with transmitting the data point over a network. In some cases, however, a raw time and a receipt time may be the same, such as if network latency is low and/or if the precision of the raw time and/or receipt time is larger than the network latency (e.g., when the raw time and the receipt time have a precision of 1 second and network latency is less than 100 ms). The ingestion subsystem 125 may remove extraneous information from the time series data, as desired, and may adjust or format the time series data to a standard format, if not already so formatted.

A metadata system may optionally create or assign metadata (e.g., identifiers, dimensions, tags, labels, or the like), to the data points, such as if such metadata is not already assigned or present in the data points or if the metadata system is otherwise assigned to or has rules indicating such metadata is to be assigned. The metadata system may retrieve from or store metadata information to metadata storage. Optionally, metadata storage may store an index or rules for associating various metadata with various time series data or components thereof.

In some instances, the time series data processing system can include a roll-up system. The roll-up system may process received data points to as to transform the data values in the received data points to roll-up data points including quantized values associated with one or more regular time intervals. The regular time intervals may be as small as time intervals associated with the received data points but may also be larger, such that multiple values for multiple data points can be combined to generate a quantized value. For example, the received data points may be associated with a time interval of 0.1 seconds, such that 10 data points are received each second; the roll-up data points may be generated for every 1 second, every 5 seconds, every 15 seconds, every minute, etc., on an ongoing basis. Assuming all data points are received and included in the combination for generating roll-up data points, each 1 second roll-up data point may have a quantized value generated from values for 10 data points. Similarly, each 5 second roll-up data point may have a quantized value generated from values for 50 data points, each 15 second roll-up data point may have a quantized value generated from values for 150 data points, and each minute roll-up data point may have a quantized value generated from values for 600 data points.

When combining values from multiple data points to generate a quantized value for a roll-up data point, any desirable technique may be used. In some cases, the quantized value may correspond to a sum of the data values. In some cases, the quantized value may correspond to a statistical measure of the data values, such as an average or standard deviation. In some cases, a formula or algorithm may be used for computing quantized values from a plurality of data values. Roll-up system may store roll-up data, such as in the form of time series data, to time series storage.

To determine which data points may be combined for generating roll-up data points, each roll-up data point may be associated with a roll-up window. A roll-up window may correspond to a time period with a length of the time interval for the roll-up. Data points having a raw time falling in the roll-up window may be assigned to the roll-up window and data points having a raw time outside of the roll-up window may be assigned to another roll-up window. In one example, a 1 minute roll-up data point may have a 1 minute roll-up window that starts at 12:00:00 and ends at 12:01:00, such that any data points having a raw time between 12:00:00 and 12:01:00 may be assigned to the 12:00:00-12:01:00 window. In some cases, the lower end point may be inclusive while the upper end point may be exclusive (e.g., a data point with a raw time of 12:00:00 will be assigned to the 12:00:00-12:01:00 window and a data point with a raw time of 12:01:00 will be assigned to the 12:01:00-12:02:00 window and not the 12:00:00-12:01:00 window). In some cases, the lower end point may be exclusive while the upper end point may be inclusive (e.g., a data point with a raw time of 12:01:00 will be assigned to the 12:00:00-12:01:00 window and a data point with a raw time of 12:02:00 will be assigned to the 12:01:00-12:02:00 window and not the 12:02:00-12:03:00 window). Other end point assignment variations are possible.

In some cases, it may be desirable to combine or associate different time series with one another, such as for various analytics purposes. An analytics system may be used to generate, combine, or otherwise aggregate data from one or multiple different time series to generate an aggregated time series that may be grouped over a common attribute (e.g., a metadata attribute). Optionally, the time series used by the analytics system to generate an aggregated time series may include roll-up data points as generated using roll-up system, as described above. In some examples, one time series may include data points with values for processor usage for a particular processor core and a second time series may include data points with values for processor usage for another processor core, and it is desired to determine an overall total or average processor core usage. As another example, multiple time series (e.g., including roll-up data at a fixed time interval or roll-up window) may include data points for processor usage for various processors in a particular data center and it may be desired to have a time series including an overall total or average processor usage for the data center. The analytics system can identify the time series that include metadata identifying the particular data center and determine a sum or average of the processor usage for all the identified time series on a per time interval or roll-up window basis to generate aggregated data points for an aggregated time series representing the overall total or average processor usage for the data center. The analytics system may optionally store the aggregated time series to time series storage. In some examples, the analytics system may optionally receive input identifying aggregated time series to generate and then generate such aggregated time series in response.

As time series data from data sources is received on a continuing basis, the ingestion subsystem 125, metadata system, and/or analytics system may perform the above-described aspects repeatedly and optionally in real-time as additional data points are received. As the roll-up data, optionally including aggregated data, is generated, it may be desirable to publish the data, such as by transmitting the roll-up data to a remote system or by storing the roll-up data to long term storage. For example, a publishing system may publish time series data (e.g., roll-up data) by transmitting to streaming analytics system or storing the data to data storage. The publishing system may transmit or store the data in real-time or near-real-time, such as according to a publication schedule. In some examples, the publication schedule may indicate a roll-up data point or an aggregated data point is to be published at some time after a roll-up window associated with the data point ends. Optionally, the publication time may be a fixed time duration after a roll-up window ends, such as 5 seconds. In some examples, however, the publication time may be variable and determined on an ongoing basis depending on various conditions, as described in further detail below. Optionally, publishing system can retrieve stored time series data from data storage and transmit to streaming analytics system, or otherwise cause stored time series data stored at data storage to be transmitted to streaming analytics system.

The streaming analytics system can be used to visualize and monitor conditions and/or machine data associated with or generated by the various data sources, such as in the form of time series data that is collected and quantized into roll-up data points. In some cases, the streaming analytics system can enable identification of problems, errors, or undesired performance associated with one or more of the data sources in real-time or near real-time, allowing for troubleshooting and resolution of such issues while minimizing downtime. For example, the time series data may comprise a processing load on each of the data sources, such as data sources that correspond to a plurality of servers distributed across a plurality of data centers. The time-series data for different servers in different data centers can be correlated and rolled up, for example, and publish the roll-up data points to the streaming analytics system, which can monitor the processing usage on a per-data center basis, for example. In one example, the streaming analytics system can identify a change in processing usage at a particular data center, which can indicate that insufficient resources may be allocated or that a software fault or operational problem may exist at the data center or with one or more of the servers. In some cases, the streaming analytics system can generate a notification or alert, such as based on a trigger condition (e.g., a threshold value in the time series data) being met. Optionally, the streaming analytics system can generate reports based on the time series data. For example, the streaming analytics system can generate reports indicating processing usage for a particular duration (e.g., hours, days, weeks, or months), for one or more data centers or one or more servers, optionally indicating trends, for example. In some cases, the streaming analytics system can obtain historical time series data, such as from the data storage, for purposes of visualization, report generation, issue analysis, or the like.

The streaming analytics system may include software applications that permit users to interact with the data resolution monitoring system 120, such as for purposes of selection of time series data to be published to the streaming analytics system, specification or assignment of metadata, identification of alert conditions or triggers, on-demand report generation, selection of automatic report generation based on trigger or threshold conditions, or the like. In some embodiments, the software application can be an internet browser, which may include client side code (e.g., Java Script) for accessing the data resolution monitoring system 120. In some embodiments, the software application is a proprietary application developed for interacting with the data resolution monitoring system 120.

The stream(s) of data points ingested by the ingestion subsystem 125 can be processed by an input resolution detection subsystem 130. The input resolution detection subsystem 130 can process the ingested data points for each stream of data points and derive an input resolution for a data block. For example, a number of streams of data points can be processed for a data block, and an input resolution can be derived based on data resolutions for each of the number of streams of data points. The derived input resolution can include an interval at which the data points are passed to the output data subsystem 140.

The output data subsystem 140 can aggregate data points at intervals according to input resolutions for each data block. Further, the output data subsystem 140 can generate output data points and transmit the output data points according to an output resolution. The output resolution can be monitored and generated by an output resolution detection subsystem 135. For instance, the output resolution detection subsystem 135 can set the output resolution for a first value based on the derived input resolution for each data block. Further, responsive to a change in the data resolution being detected, the output resolution detection subsystem 135 can derive a new output resolution value to a second value different than the first value. The output resolution detection subsystem 135 can modify the output resolution based on one or more constraints to manage computing resources dedicated to performance of each job.

In some instances, the data resolution monitoring system 120 can interact with a detector initialization system. The detector initialization system can initialize a detector to process one or more streams of data and trigger an alert responsive to any triggering parameters being met. The detector initialization system can interact with the data resolution monitoring system 120 to derive a data resolution of the streams of data points, monitor for a change in an data resolution of the detector, and/or update an output resolution based on the change of the data resolution as described herein.

2.0 Output Resolution Calculation of a Stream of Metric Time Series Data

Figure 2:
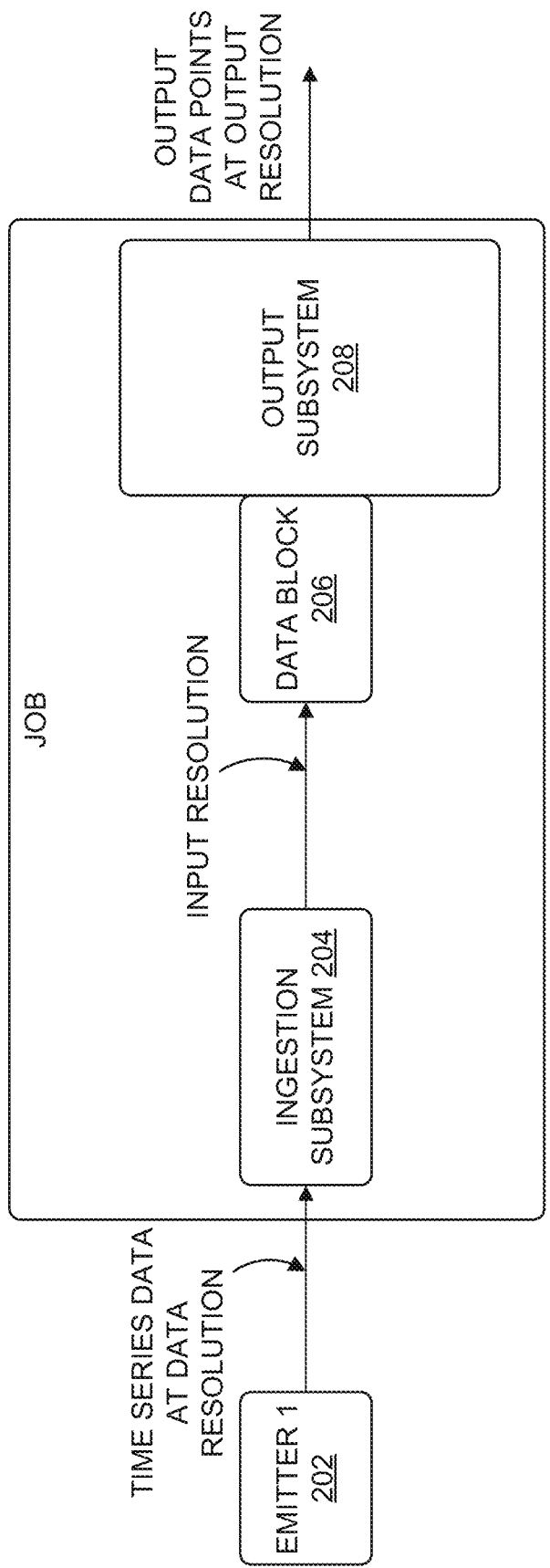
FIG. 2 is a block diagram of a data resolution monitoring system for deriving an output resolution of a single stream of metric time series data.

As described above, the data resolution monitoring system 120 can process metric time series data as part of a job. For example, metric time series data can be processed via one or more services to identify anomalous data in the metric time series data and provide a notification of the anomalous data to the client. In some instances, the resolution of the metric time series data and an output resolution can be statically derived initially at the start of a job. Further, during performance of the job, the resolution of the input data can be dynamically modified. FIG. 2 is a block diagram of a data resolution monitoring system 200 for deriving an output resolution of a single stream of metric time series data. The system as shown in FIG. 2 can obtain time series data, process the data to derive an input resolution of the time series data, and output data points at an output resolution based on the input resolution.

A new job can be triggered when a client requests for analysis to be performed on time series data. For example, the client can request a visualization of one or more parameters relating to time series data. In some instances, responsive to a change in the output resolution, the system can dynamically update the output resolution or the job can be restarted.

A job can have one or more blocks, and each block can be configured to perform certain computations that the job performs. There can be one or more streams of metric time series (MTS) data associated with a job, each MTS can stream multiple data points. For an MTS, the data points may be received in a periodic or aperiodic basis. MTS data can be subdivided into multiple MTSs per block. Each block can have multiple associated MTSs.

As shown in FIG. 2, an emitter 202 can provide time series data at a data resolution to an ingestion subsystem 204. The ingestion subsystem 204 can obtain the time series data, calculate the data resolution, and derive an input resolution of the time series data. A data resolution can be on a per MTS level. The data resolution can be specified by the client (e.g., via emitter 202) and can be derived based on an inter arrival time between data points emitted by the emitter corresponding to the MTS.

An input resolution can include a resolution specified by ingestion subsystem 204. The input resolution can be at a block level (or at a job level if there is only one block per job). Each ingestion subsystem can specify a unique input resolution. The input resolution can be used to determine how many data points are being ingested by that block for analysis, as the input resolution can be different from the per data resolutions of the MTSs associated with the job. There can also be an associated rollup value for each ingested data point.

For example, if a data resolution for an MTS is 1 sec, an output resolution of the job could be every hour (i.e., 1 hr). Processing 60 min*60 sec data points by the job for each hourly output can put a strain on the compute resources, and the input resolution may be set to, for example, every minute (e.g., 1 min). Thus, each ingested data point can correspond to 60 received data points. Further, in this example the rollup factor for each data point ingested by the job is 60 received data points.

The data points ingested at ingestion subsystem 204 can be provided to a data block 206 at the input resolution. The output subsystem 208 can obtain the data points at the input resolution and output data points at an output resolution. For example, the output data points can be used to generate a visualization of the time series data at an interval specified by the output resolution.

The output resolution can be at a job-level and can include a resolution at which the job outputs data to the user, where the data that is output can be based upon the data points received via the MTSs associated with that job. The output resolution can specify an inter arrival time of data points being streamed to the client. The output resolution can be calculated based upon input resolutions for the blocks in the job and other constraints. In many cases, the output resolution may have been calculated when the job was started and did not change for the entirety/lifetime of the job, or until manually forced. Accordingly, in these cases, the output resolution for a job, once calculated at the start of the job, may have not changed even if the data resolution changed from what it was at the start of the job.

In the present embodiments, the output resolution is dynamically changed in response to a change in data resolution detected from one or more MTSs associated with the job or a change in the MTSs associated with a job, with the new MTSs having different data resolutions. In certain implementations, the job is restarted with the new output resolution.

As described above, the present embodiments can detect a change in data resolution for the MTSs and dynamically recalculate the output resolution for the job. The output resolution for a job can be changed if the input resolution for a data block is changed in response to a change in the data resolutions of the MTSs feeding that data block. A majority symbol (MS) algorithm can be used to efficiently determine the dominant data resolution (or mode) of the data resolutions. A MS object can be maintained per MTS and can include a very small memory footprint. The present system can also have access to the timestamp and count rollup of each ingested data point that can be used to derive a mean data resolution for aperiodic data and exact resolution for periodic data.

Figure 3:
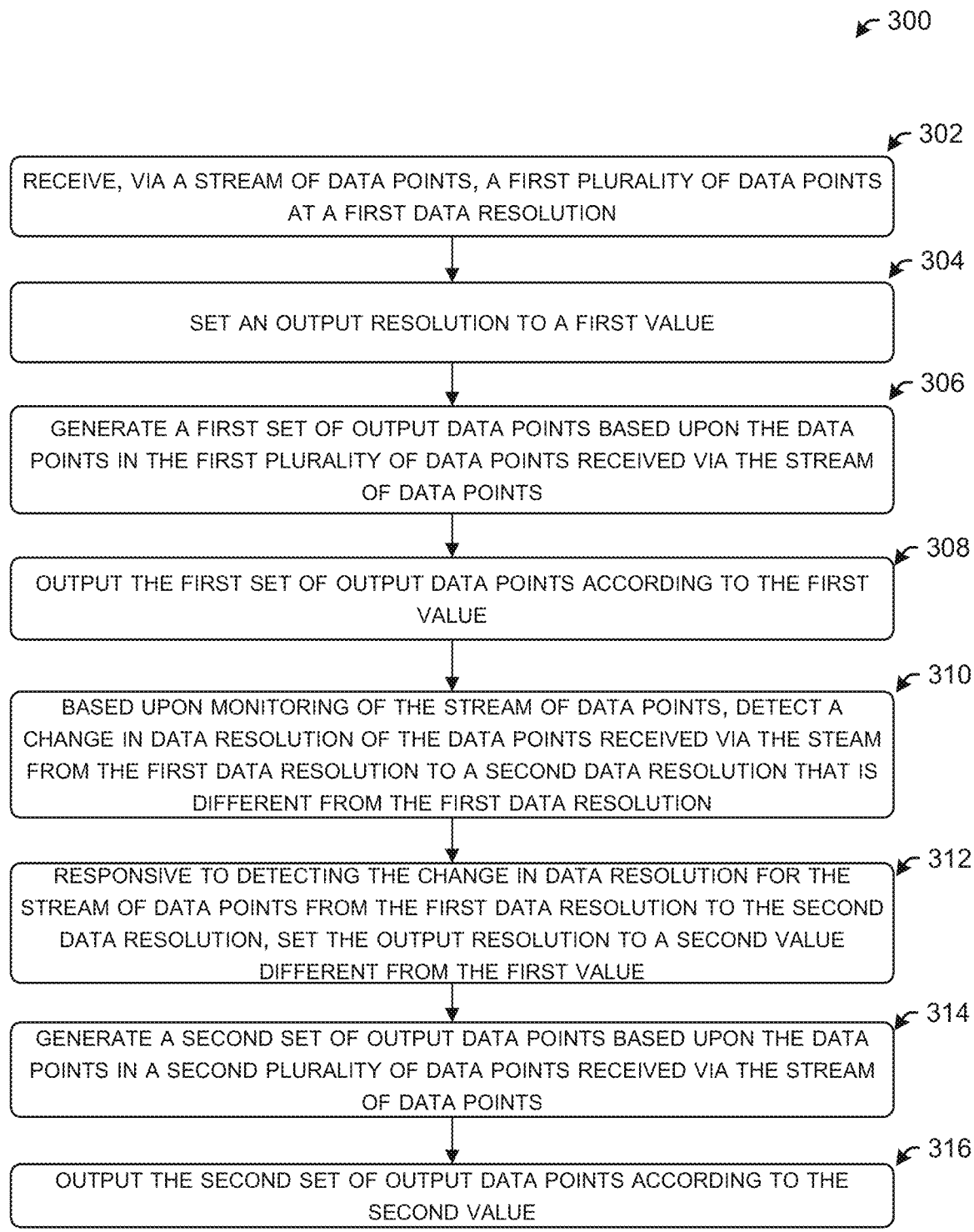
FIG. 3 is a flow process illustrating a process for deriving an output resolution of a single stream of metric time series data.

FIG. 3 is a flow process illustrating a process 300 for deriving an output resolution of a single stream of metric time series data. At 302, the process can include receiving, via a stream of data points, a first plurality of data points at a first data resolution. For example, emitter 202 can provide the time series data to ingestion subsystem 204. Each data point in the stream of data points can be associated with a time stamp. The first data resolution can correspond to an inter-arrival time between the data points in the first plurality of data points.

At 304, the process can also include setting an output resolution to a first value. The first value of the output resolution can include an output resolution for the start of the job or a previously-derived updated output resolution in response to a change in the data resolution of the time series data.

At 306, the process can also include generating a first set of output data points based upon the data points in the first plurality of data points received via the stream of data points. The output data points can be generated and/or outputted at an interval corresponding with the output resolution.

At 308, the process can also include outputting the first set of output data points according to the first value. The first value can represent a time between the data points in the first set of output data points being output.

At 310, the process can also include, based upon monitoring of the stream of data points, detecting a change in data resolution of the data points received via the stream from the first data resolution to a second data resolution that is different from the first data resolution. For example, the client can change the emitter 202 to increase/decrease the intervals in which data points are provided to the ingestion subsystem 204.

At 312, the process can also include, responsive to detecting the change in data resolution for the stream of data points from the first data resolution to the second data resolution, setting the output resolution to a second value different from the first value. The second value can be based on an updated input resolution for the time series data.

At 314, the process can also include generating a second set of output data points based upon the data points in a second plurality of data points received via the stream of data points. The second value can represent a time between the data points in the second set of output data points being output.

At 316, the process can also include outputting the second set of output data points according to the second value. The second set of output data points can be generated according to the change in the data resolution of the time series data. This can allow for capturing of insights into the time series data identifiable due to the updated data resolution of the time series data.

2.1 Dynamic Detection of Resolution Changes in Multiple Streams of Metric Time Series Data In some instances, multiple streams of data can be processed as part of a job. For example, a client can provide multiple streams of metric time series data via one or more computing instances (e.g., emitters). The data resolution monitoring system can include one or more ingestion subsystems that can process multiple streams of data points at varying data resolutions and derive input resolution values that each correspond to a portion of the multiple streams of data points. Each portion of the multiple streams of data points may comprise a data block. The input resolution values can be used by an output subsystem to derive an output resolution for the job.

Figure 4:
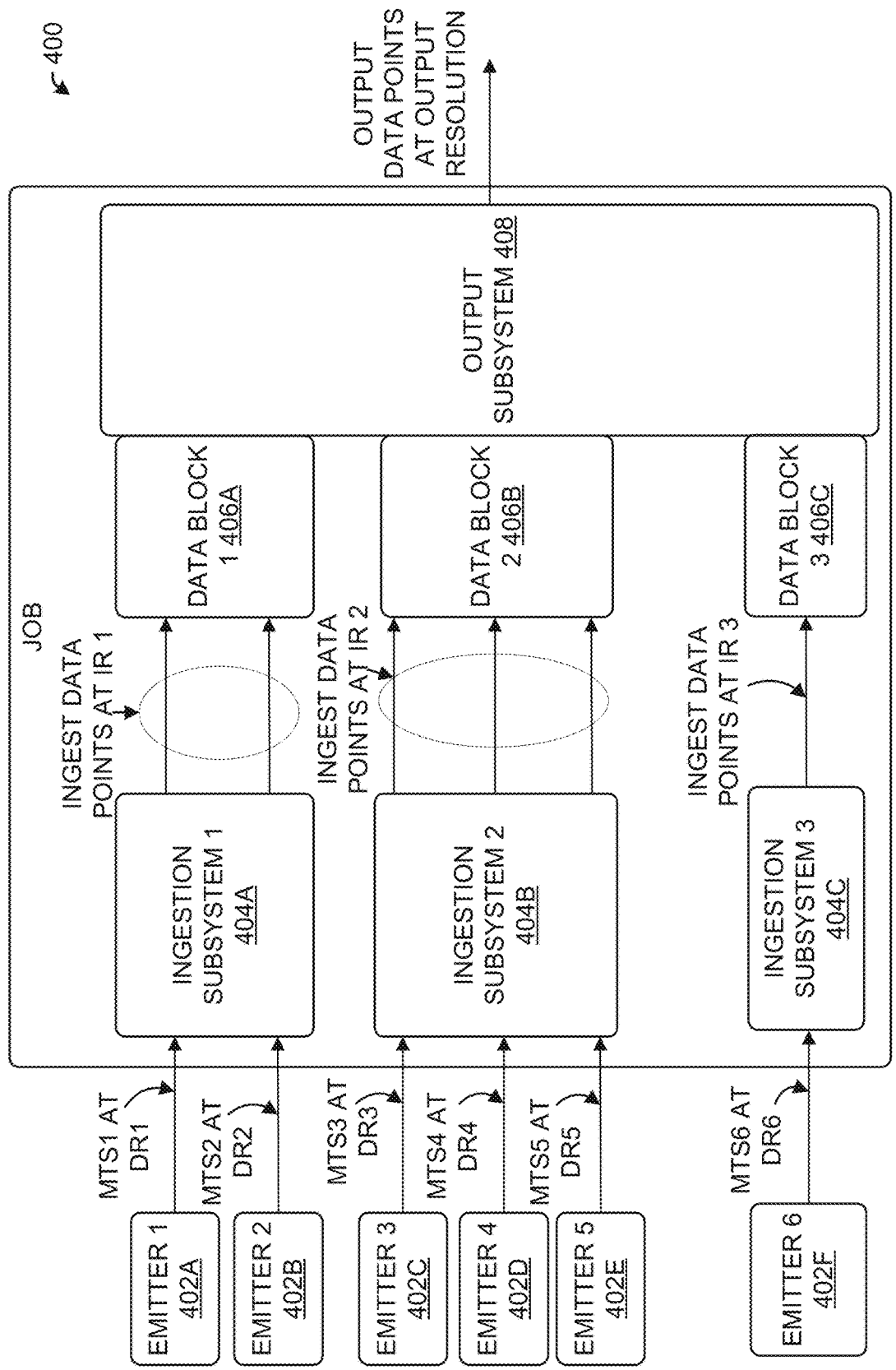
FIG. 4 is a block diagram of a system for detecting resolution changes in multiple streams of data points.

FIG. 4 is a block diagram of a system 400 for detecting resolution changes in multiple streams of data points. As shown in FIG. 4, a series of emitters (e.g., emitter 1-6 402a-f) can each provide a stream of data points at varying data resolutions. For instance, emitter 1 402a sends a first stream of data points (e.g., MTS1) at a first data resolution (DR1). Each emitter can represent a computing instance or a port corresponding with one or more computing instances providing data points to the data resolution monitoring system.

The data resolution monitoring system can include a series of ingestion subsystems (e.g., 404a-c) to obtain one or more streams of data points from emitters 402a-f. For example, a first ingestion subsystem 404a can obtain two streams of data points from emitters 402a, 402b at different data resolutions, while ingestion subsystem 3 404c can obtain a single stream of data points from emitter 402f. Each of the series of ingestion subsystems (e.g., 404a-c) can specify an input resolution of one or more streams of data points and can ingest the data points at the input resolution of each ingestion subsystem. For instance, the input resolution for each ingestion subsystem can be based on an average or highest data resolution of the one or more streams of data received at each ingestion subsystem.

Each ingestion subsystem 404a-c can ingest data at an emitted data resolution and stream data to corresponding blocks (e.g., data block 406a-c) at an input resolution. Each ingestion subsystem 404a-c can correspond with a data block 406a-c. A data block 406a-c can specify a portion of computing instances assigned to process ingested data points provided in the multiple streams of data points.

The output subsystem 408 can obtain ingested data points at various input resolutions for each data block 406a-c and generate a set of output data points. The output data points can be generated and/or transmitted at an output resolution that corresponds to the one or more input resolutions. For example, the set of output data points can include data points for updating a visual representation (e.g., a near real-time graph) of a parameter relating to the multiple streams of data points.

In some instances, as part of the dynamic resolution, a transformation of a number of slots in a window can change. For example, data can start with a 1 second resolution, and transformations of over 1 hour can include a window of 3600 slots. With a resolution change of 5 seconds, only 720 slots are needed. In this example, the system can obtain 5 second data points from a time series data base (tsdb) comprising a rollup of five 1 second data points. Due to an output resolution change, new calculations can be triggered at a new output resolution that can lead to alerts triggering (or not triggering) due to the new output resolution.

In some embodiments, a job can move to a finer output resolution if the block with the coarsest input resolution is detected to have metric time series data that have moved to a finer data resolution and there are no other resolution limiters that would constrain the output resolution of the job. For example, a job can include 3 data blocks. A first data fetch includes an input resolution of 5 s, a second data fetch includes an input resolution of 30 s, and a third data fetch includes an input resolution of 1 min. Due to the third fetch including a coarser input resolution of 1 min (compared to a 5 s input resolution), the job may run at a resolution of 1 minute. If the resolution of the data was a finer resolution (e.g., 30 seconds), a dynamic resolution estimation can detect this change and restart the job at a 30 second output resolution.

As another example, a job can move to a coarser output resolution if a block is detected to have metric time series data that have moved to a coarser data resolution and there are no other resolution limiters that would constrain the output resolution of the job. For example, a job can include 3 data blocks. A first data fetch includes an input resolution of 5 s, a second data fetch includes an input resolution of 30 s, and a third data fetch includes an input resolution of 10 seconds. Due to the second fetch having a coarser input resolution, the job can run at an output resolution of 30 seconds. If the resolution was moved to a coarser resolution of 1 minute, the dynamic resolution estimation can detect the change and restart the job at the 1 minute output resolution.

In some instances, the system can fire alerts that would not have fired before using the dynamic resolution estimation. For example, if a job has been running at a 5 minute output resolution and has a transformation over the past day. If the output resolution is changed to 1 minute, the job can restart at the detected output resolution and can re-prime a window state. This can lead to conditions being met that can fire alerts that were not detected before.

As described herein, metric time series data can be monitored during a job to determine whether the resolution changes. Responsive to determining a change to the resolution of the metric time series data, a new output resolution can be calculated, and an action corresponding to the job according to the new output resolution can be performed. Identifying a change in resolution in the metric time series data and deriving a new output resolution can allow for identifying relevant data in the metric time series data and updating an output for the job according to the updated resolution of the metric time series data and the updated output resolution.

A majority symbol resolution estimation object can be initialized for each metric time series. The object can include any of a static size of bag (e.g., comprising 3 bits), an array size of bag for modes, array size of bag for counts, a long value of a last timestamp, a long value of alignment, an integer for running count sum of counts array, and a bit set comprising four bits to keep running check of a dominant mode index. For example, if the dominant index changes at any time or the data resolution at that index has changed, the fourth bit of the bit set can be changed to quickly check data resolution change.

In some instances, the object can include a number of bytes. For instance, the object can include an object overhead, a number of bytes for modes array, a number of bytes for counts array, a number of bytes for 2 longs, a number of bytes for a running count, a number of bytes for maintaining dominant mode and change detections, and a number of bytes for padding (e.g., because the object can have an alignment enabled). The object can be used to efficiently monitor a metric time series for a change in resolution.

Particularly, data points can be processed to identify a timestamp and count rollup for the data point. The timestamp and count rollup can be used to derive a mean resolution (for aperiodic data) or an exact resolution (for periodic data). Further, an inter-arrival time can be derived for each data point, which can be divided by a count rollup to obtain the mean or exact resolution. The derived resolution can then be weighed by a count rollup.

Further, in performing the calculation(s) to derive the resolution for a data point, a rolling sum and a dominant mode can be tracked. If a dominant mode changes, the detected resolution can change. In some instances, a job can be restarted or migrated if an output resolution changes.

Figure 5:
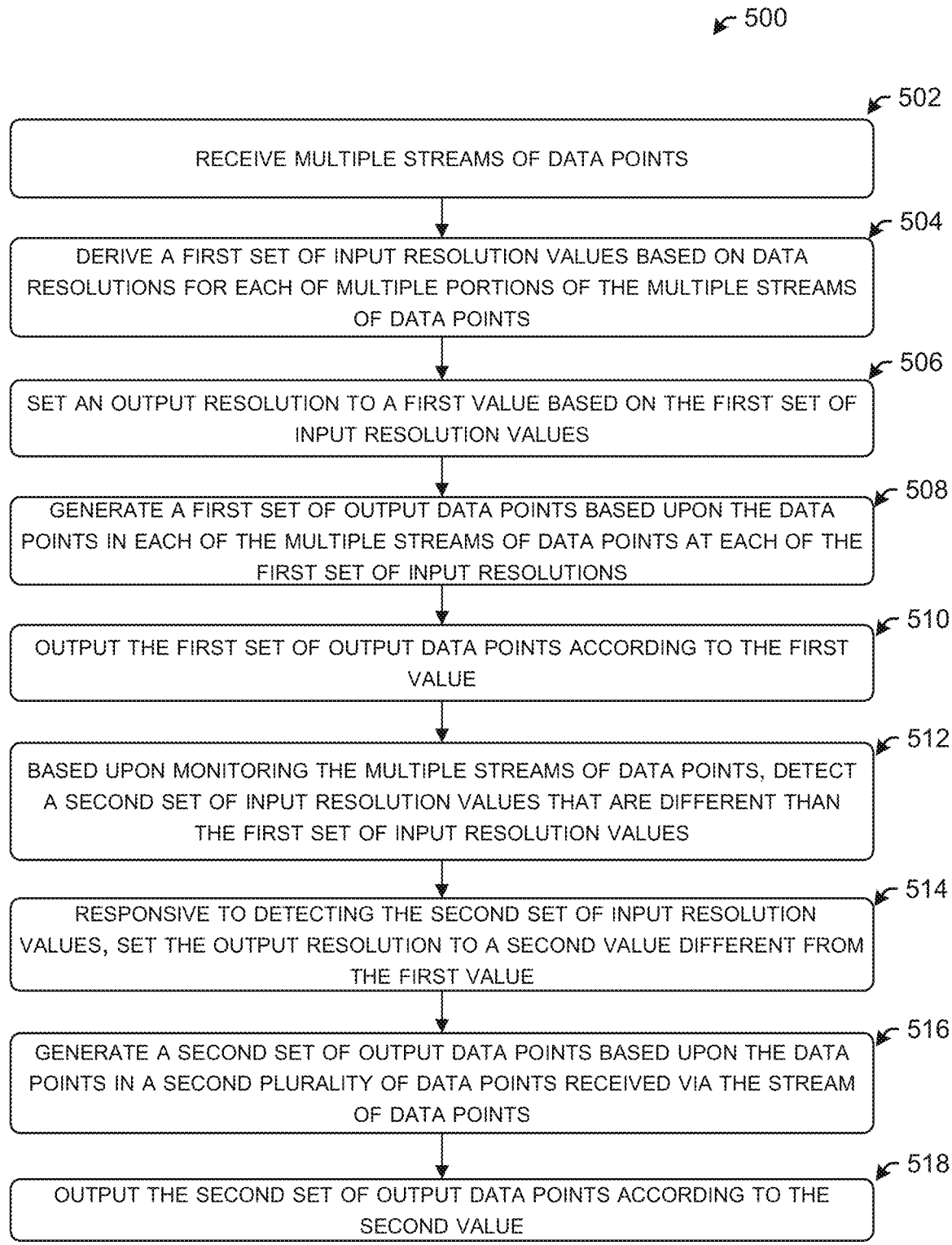
FIG. 5 is a flow process illustrating a method for detecting resolution changes in multiple streams of data points.

FIG. 5 is a flow process illustrating a method 500 for detecting resolution changes in multiple streams of data points. At 502, the method can include receiving multiple streams of data points. Each of the multiple streams of data points can include a data resolution. Further, each data point in each stream of data points can be associated with a time stamp. Each data resolution can correspond to an inter-arrival time between data points in the each of the multiple streams of data points.

At 504, the method can include deriving a first set of input resolution values based on data resolutions for each of multiple portions of the multiple streams of data points. Each of the multiple portions correspond to data blocks.

A time between points (or a "periodicity") of time series data can be determined if data is periodic or aperiodic. For example, for aperiodic data, if the system obtains a metric time series aperiodically at 2 minute to 6 minute intervals. In this example, inspecting the timestamps for a certain interval can identify that 5 minute intervals appears most frequently despite the intervals not being periodic. Based on this, the estimated resolution can be shown as 5 minute intervals. As more data is obtained, the resolution can be updated to derive a mean data resolution.

For instance, using the timestamp and count rollup, the system can obtain the mean data resolution for aperiodic data and exact resolution for periodic data. On each quantized point for each metric time series, the system can pass in the timestamp and the count rollup. Internally, the system can calculate the inter-arrival time and divide by the count rollup to get the mean or exact data resolution. The data resolution can then be weighted by the count rollup in the algorithm.

The system can also track the rolling sum of the counts and the dominant mode determined. If the dominant mode changes, the system can mark the new dominant mode and also set the 4th bit in the bitset to denote a data resolution change detected. The system can clear this bit on query for detection change so that the system can detect only the change in resolution for next iteration.

At 506, the method can include setting an output resolution to a first value based on the first set of input resolution values. The first value can include an interval to generate output data points based on a combination of the first set of input resolution values.

At 508, the method can include generating a first set of output data points based upon the data points in each of the multiple streams of data points at each of the first set of input resolutions. The output data points can provide insights into the streams of data points, such as anomalous data patterns in the data, for example.

At 510, the method can include outputting the first set of output data points according to the first value. The first value can represent a time between the data points in the first set of output data points being output.

At 512, the method can include, based upon monitoring the multiple streams of data points, detecting a second set of input resolution values that are different than the first set of input resolution values. The second set of input resolution values can represent a change to a dominant mode of the data resolutions of streams of data points.

At 514, the method can include, responsive to detecting the second set of input resolution values, setting the output resolution to a second value different from the first value. The second value can reflect the change to the data resolutions of the stream of data points.

At 516, the method can include generating a second set of output data points based upon the data points in a second plurality of data points received via the stream of data points.

At 518, the method can include outputting the second set of output data points according to the second value. The second value can represent a time between the data points in the second set of output data points being output.

3.0 Initialization of a Detector for a Client

In many instances, a detector can be initialized for a client. The detector can include an application or service configured to ingest metric time series data and monitor the data for anomalous data. For example, a time series data processing system can implement a detector to process metric time series data for a client and trigger an alarm responsive to the metric time series data corresponding with one or more triggering parameters. The detector can process the metric time series data to detect any anomalous data or data patterns in the metric time series data, and an alarm can be triggered specifying the anomalous data/data patterns.

The detector can be initialized for the client with minimal pre-configuration of the detector specific to the client. However, in many instances, the detector may not have a pre-configured resolution for monitoring the metric time series data, as the resolution of the metric time series data may initially not be known. Determining the resolution of the metric time series data may be performed after receipt of the time series data, and an output resolution of the detector can be configured/modified based on the determined resolution of the metric time series data. Further, the resolution of the metric time series data can change during the job. Without detecting the change in the resolution of the metric time series data, the detector may not change the output or can miss anomalous data patterns in the metric time series data at the new resolution.

The present embodiments relate to implementing a detector for a client that can dynamically estimate a resolution of the time series data while the detector processes the time series data to generate an alert if the data corresponds with any triggering parameters. Dynamically detecting the change in resolution of the time series data can allow for dynamic updating of an output resolution of the detector to capture the change in resolution of the time series data. For instance, if the resolution of the time series data is increased, the detector can increase the output resolution accordingly, thereby capturing any anomalous data in the time series data at the new resolution.

As an illustrative example, a detector can be implemented for a client. The detector can be configured to process time series data and provide an alert responsive to determining that the time series data correspond with one or more trigger parameters. The detector can be implemented with a series of pre-configured parameters for monitoring the time series data points and provide the alert responsive to determining that the time series data correspond with one or more trigger parameters included in the series of pre-configured parameters.

A stream of time series data points can be received and an initial resolution of the stream of time series data points can be derived. An initial output resolution can be derived based on the initial resolution. The initial output resolution can specify an interval for processing the stream of time series data points.

The stream of time series data points can be monitored for a modification in the initial resolution of the stream of time series data points. Responsive to determining the modification in the initial resolution of the stream of time series data points, an updated resolution of the stream of time series data points and/or an updated output resolution of the stream of time series data points based on the updated resolution can be derived.

The stream of time series data points can be compared with the one or more trigger parameters at either the initial output resolution or at the updated output resolution. In some instances, the initial resolution comprises an interval that is lower than an interval of the updated resolution, and wherein the updated output resolution includes an interval lower than that of the initial output resolution to increase a frequency in comparing the stream of time series data points with the one or more trigger parameters. This can allow for identifying anomalous data at the increased intervals provided in the stream of time series data that would not have been captured at the initial output resolution, for example.

Responsive to determining that the stream of time series data points correspond with any of the one or more trigger parameters, an alert message can be generated. The alert message can include a timestamp specifying a time of determining that the stream of time series data points correspond with any of the one or more trigger parameters and a description of the identified trigger parameters in which the stream of time series data points correspond. The alert message can be transmitted to the client device.

Figure 6:
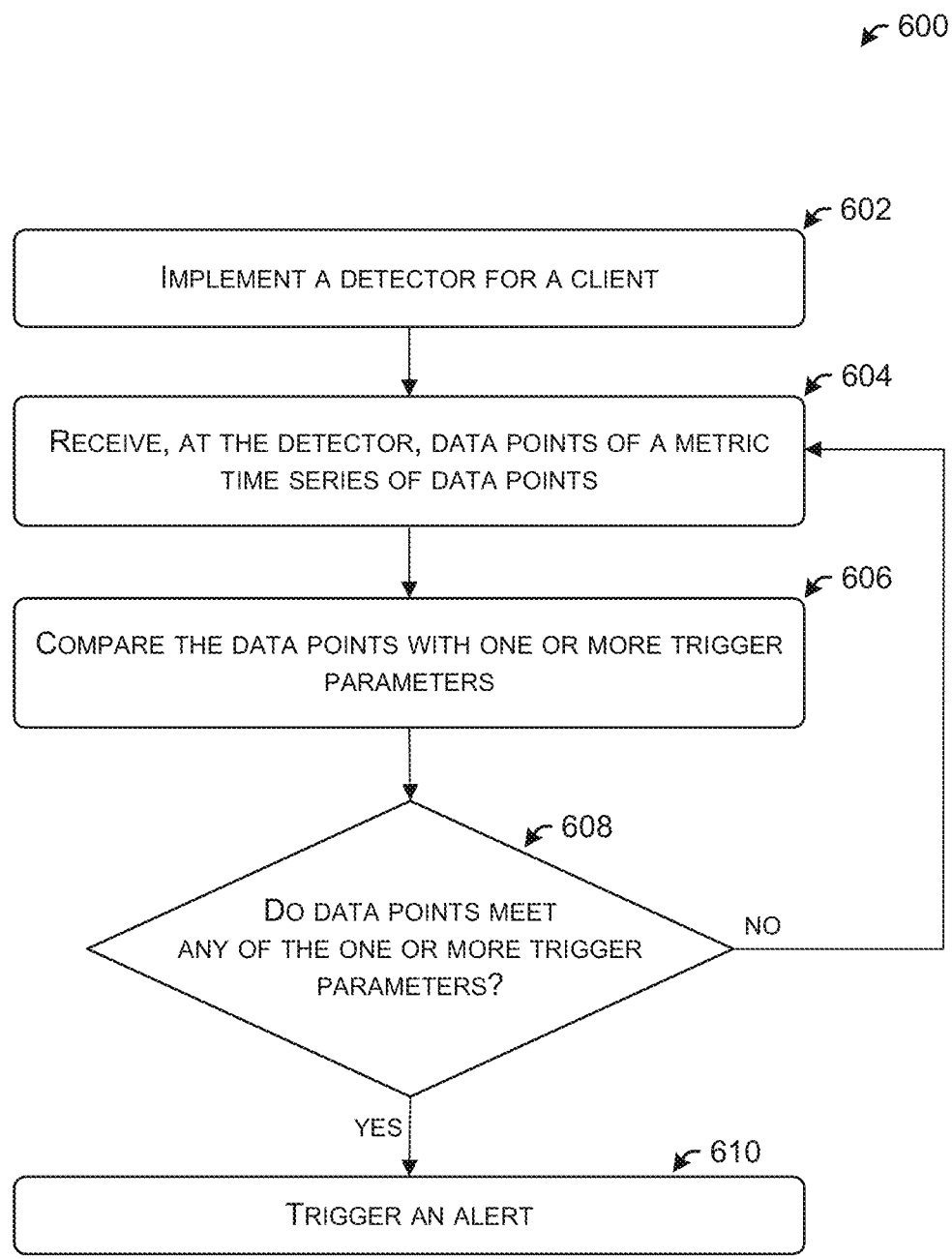
FIG. 6 illustrates a flow process of an example process for implementing a detector.

FIG. 6 illustrates a flow process of an example process 600 for implementing a detector. At 602, a detector can be implemented for a client. This can include a system (e.g., time series data processing system 120) generating a detector for a client and assigning computing resources (e.g., at the time series data processing system 120 or at a client device). The detector can be associated with a client device for ingesting metric time series data from the client device.

At 604, the detector can obtain data points of a metric time series of data points. The data points can be ingested at a resolution specified by the client. For example, the detector can be configured to obtain the data points from one or more client devices at intervals specified by the client that can change dynamically by the client.

At 606, the data points can be compared with one or more trigger parameters. For example, data points can specify computing capacity of a client system or a number of network requests performed by a client system. Comparing the data points with the one or more trigger parameters can include determining whether the data point values meet threshold values in the trigger parameters specifying anomalous data/data patterns.

At 608, a determination is made whether the data points meet any of the one or more trigger parameters. The data points can be compared with trigger parameters to determine whether an anomalous data pattern exists. For instance, if the computing capacity exceeds a threshold level at a given time instance, a triggering parameter can be met, indicating anomalous data. If no triggering parameters are met in the data, the system may continue to receive and compare subsequent data points with the trigger parameters to monitor for anomalous data (e.g., in 606).

At 610, responsive to one or more trigger parameters being triggered, an alert can be triggered. For instance, an alert can be sent to the client specifying a timestamp, a nature of the anomalous data, etc. Subsequent actions can be performed responsive to sending the alert, such as turning off a port at a client system or migrating resources from an affected computing instance, for example.

3.1 Dynamic Resolution Calculation of a Detector

As described above, a detector initialized for a client may include a series of pre-configured parameters. However, the detector may not be aware of a resolution of the time series data provided by the client. Further, if the resolution changes during performance of the job, the detector may not detect the change, potentially missing anomalous data included in the time series data provided at the new resolution. Alternatively, if the resolution is changed by the client to increase the intervals that the time series data is provided, the detector may continue to process the time series data at an initial output resolution, leading to inefficient use of computing resource in monitoring the time series data.

Figure 7:
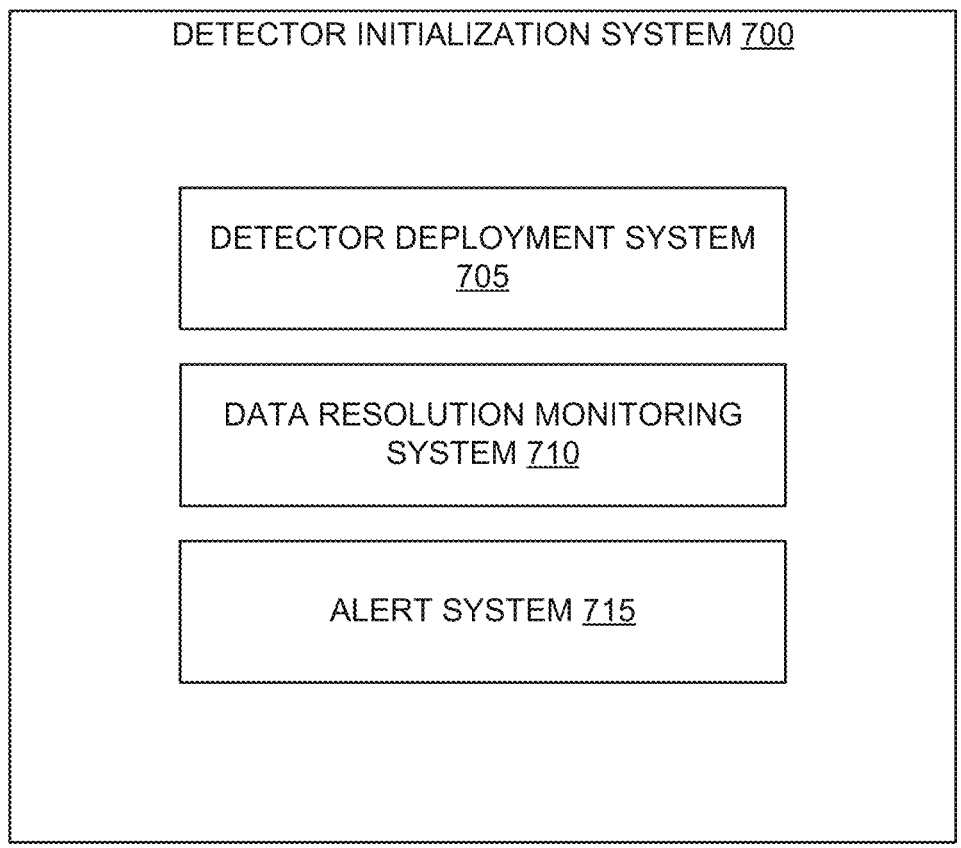
FIG. 7 provides a block diagram of an example detector initialization system.

FIG. 7 provides a block diagram of an example detector initialization system 700. The detector initialization system 700 can implement detector initialization for one or more clients. As described herein, a detector can be provisioned for a client to process client metric time series data and trigger one or more alerts based on identifying relevant data (e.g., anomalous data patterns) in the metric time series data.

A detector deployment system can provision one or more detectors for a client. For instance, a detector can include a number of pre-configured settings/parameters to process client data to determine whether the data corresponds with any triggering parameters. A deployed detector can ingest a stream of time series data for a client upon initialization.

A data resolution monitoring system 710 can determine a data resolution of the stream of time series data. In some instances, the data resolution monitoring system 710 can derive an input resolution of one or more data blocks for multiple streams of data points. Further, the data resolution monitoring system 710 can derive a first value for an output resolution for the detector to monitor ingested data points as described herein. The data resolution monitoring system 710 can include features similar to data resolution monitoring system 120 as described in FIG. 1.

The alert system 715 can compare the ingested stream of data points and determine whether the data points correspond with any trigger parameters. For example, the triggering parameters can relate to various anomalous data patterns, such as a threshold number of requests to a single client computing instance or a threshold processing capacity of client computing instances. Responsive to the data points corresponding with any of the triggering parameters, an alert can be provided to a client indicating a nature of the alert and a timestamp in which the alert was triggered.

Figure 8:
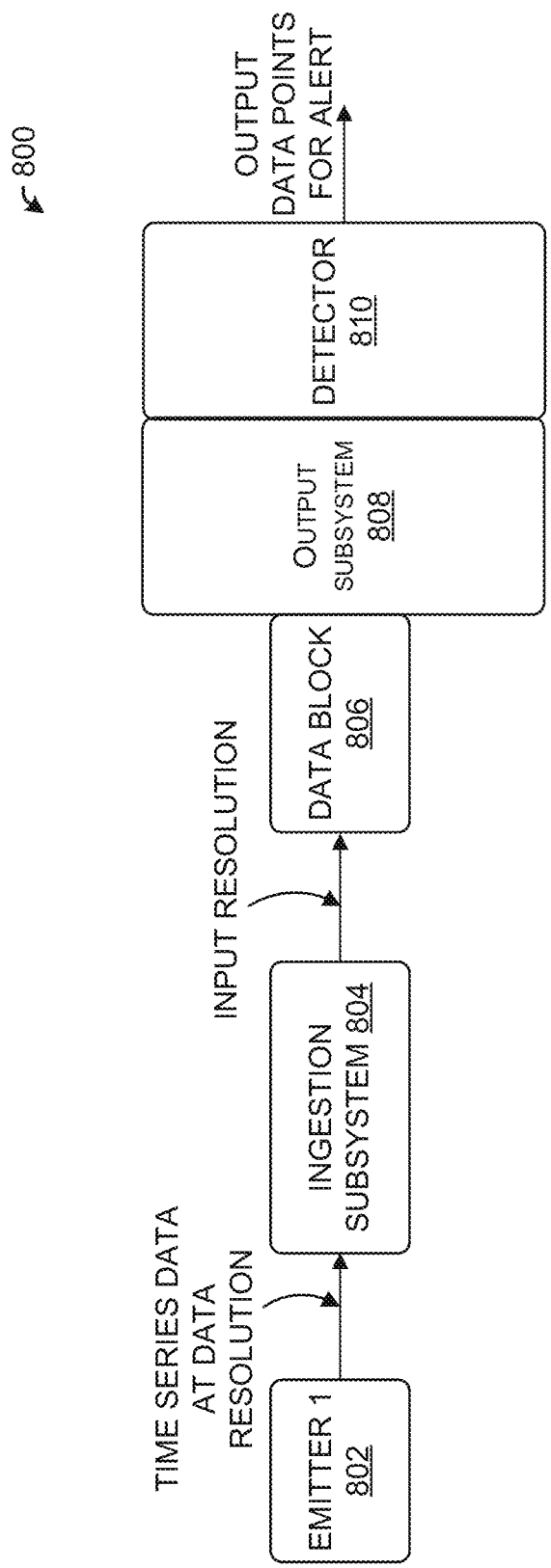
FIG. 8 is a block diagram of a system for dynamically monitoring a resolution for a detector based on a data resolution of time series data.

FIG. 8 is a block diagram of a system 800 for dynamically monitoring a resolution for a detector based on a data resolution of time series data. As shown in FIG. 8, time series data from an emitter 802 can be obtained at an ingestion subsystem 804. A data resolution for the time series data can be derived, and the data points can be ingested at an input resolution. In some instances, multiple streams of data points for a data block can be ingested, and the input resolution can be based on the data resolutions of the multiple streams of data points. The output subsystem 808 can derive an output resolution of the one or more streams of data points. The output resolution can specify an interval for a detector 810 to process ingested data points to determine whether the data points correspond with any triggering parameters.

The system as described herein can monitor the data points to determine whether the data resolution of the stream of data points has changed. Responsive to detecting a change, the output subsystem 808 can derive a new output resolution, and the detector can process ingested data points at the new output resolution. The detector 810 can provide an alert responsive to the data points corresponding with any trigger parameters.

Figure 9:
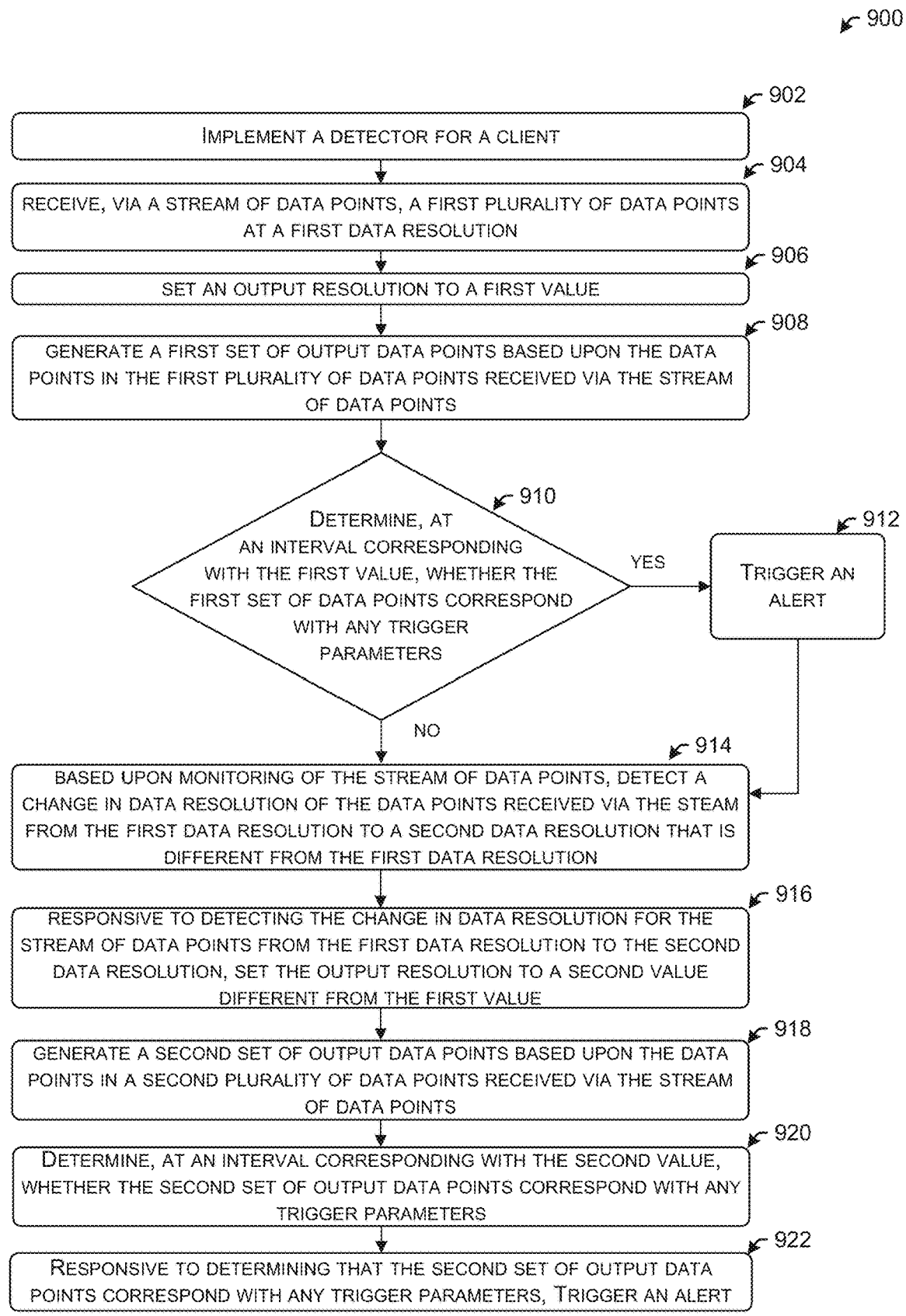
FIG. 9 illustrates a flow process of an example process for dynamic resolution estimation for a detector.

FIG. 9 illustrates a flow process of an example process 900 for dynamic resolution estimation for a detector. At 902, a detector can be implemented for a client. For instance, a detector initialization system (e.g., 700) can generate a detector for a client and assign computing resources for monitoring one or more streams of data points. The detector can be associated with a client device for ingesting metric time series data from the client device.

At 904, the detector can obtain data points of a metric time series of data points. The data points can be ingested at a resolution specified by the client. The data resolution of the stream of data points can be derived. In some instances, an input resolution can be derived based on multiple streams of data points. In some instances, the resolution can be derived by calculating the inter-arrival time and dividing the time by a count rollup to obtain a mean data resolution. The data resolution can be weighted by a count rollup to derive a dominant resolution as described herein.

At 906, an output resolution for monitoring the metric time series data can be set to a first value. The first value can include an initial frequency in which the detector monitors the time series data. The output resolution can be limited by one or more limiters to manage computing resources used by the detector to monitor the time series data.

At 908, a first set of output data points can be generated based on the data points in the first plurality of data points received via the stream of data points. The first set of data points can be generated at an interval corresponding to the first value.

At 910, it can be determined, at the interval corresponding with the first value, whether the first set of data points correspond with any trigger parameters. The data points can be compared with one or more trigger parameters. This can include determining whether values associated with data points deviate from threshold values corresponding with the trigger parameters. For example, the data points specifying a number of network requests at client network devices can exceed a threshold level of network requests specified by a triggering parameter, indicating likely anomalous behavior. For instance, if the computing capacity exceeds a threshold level at a given time instance, a triggering parameter can be exceeded, indicating anomalous data. If no triggering parameters are exceeded in the data, the system may continue to compare subsequent data points with the trigger parameters to monitor for anomalous data at the interval correspond with the first value.

At 912, responsive to one or more trigger parameters being triggered, an alert can be triggered. For instance, an alert can be sent to the client specifying a timestamp, a nature of the anomalous data, etc.

At 914, the process can also include, based upon monitoring of the stream of data points, detecting a change in data resolution of the data points received via the stream from the first data resolution to a second data resolution that is different from the first data resolution. For example, the client can change the emitter 802 to increase/decrease the intervals in which data points are provided to the ingestion subsystem 804.

At 916, the process can also include, responsive to detecting the change in data resolution for the stream of data points from the first data resolution to the second data resolution, setting the output resolution to a second value different from the first value. The second value can be based on an updated input resolution for the time series data.

At 918, the process can also include generating a second set of output data points based upon the data points in a second plurality of data points received via the stream of data points. The second value can represent a time between the data points in the second set of output data points being output.

4.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrases "at least one of X, Y or Z" or "X, Y, and/or Z" as used in general is to convey that an item, term, etc. may be include X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:
receiving a first plurality of data points of a stream of data points at a first data resolution, each data point in the stream of data points including a data point value and an associated time stamp, wherein the first data resolution corresponds to an inter-arrival time between data points in the first plurality of data points;
setting an output resolution for an output data stream to a first value;
generating a first set of output data points for the output data stream based upon the data points in the first plurality of data points received via the stream of data points;
transmitting the first set of output data points for the output data stream according to the output resolution set to the first value, wherein the first value represents a time between transmitting data points in the first set of output data points;
based upon monitoring of the stream of data points, detecting a change in data resolution of data points in the stream of data points from the first data resolution to a second data resolution that is different from the first data resolution;
responsive to detecting the change in data resolution of data points in the stream of data points from the first data resolution to the second data resolution, setting the output resolution for the output data stream to a second value different from the first value;
generating a second set of output data points for the output data stream based upon a second plurality of data points of the stream of data points; and transmitting the second set of output data points for the output data stream according to the output resolution set to the second value, wherein the second value represents a time between transmitting data points in the second set of output data points.

2. The computer-implemented method of claim 1, wherein the monitoring of the stream of data points comprises:
   initializing a majority symbol object that includes a bitset specifying the first data resolution of the stream of data points; and
   updating a bit in the bitset of the majority symbol object specifying that the change in data resolution for the stream of data points from the first data resolution to the second data resolution has been detected.

3. The computer-implemented method of claim 1, wherein the monitoring of the stream of data points comprises:
   periodically deriving a resolution of received data points of the stream of data points; and
   modifying a rolling sum tracking instances of derived resolutions of the stream of data points, wherein detecting the change in data resolution includes determining that a new resolution has a greater number of tracked instances in the rolling sum than that of the first data resolution.

4. The computer-implemented method of claim 1, wherein the second value is determined based on one or more dynamic limiters specifying a range of computing resources to be dedicated to determining the second value as specified by the second data resolution.

5. The computer-implemented method of claim 1, wherein detecting the change in data resolution of data points in the stream of data points from the first data resolution to the second data resolution comprises:
   determining that the stream of data points exhibits a series of resolution intervals across a range of interval values specifying that the stream of data points comprises aperiodic data; and
   deriving a most frequently identified resolution interval of the series of resolution intervals across the range of interval values, wherein the second data resolution comprises the most frequently identified resolution interval.

6. The computer-implemented method of claim 1, further comprising:
   receiving multiple streams of data points, each of the multiple streams of data points corresponding to different input resolutions of a set of input resolutions.

7. The computer-implemented method of claim 6, wherein the first set of output data points are generated based upon the data points in each of the multiple streams of data points at each of the set of input resolutions.

8. A data resolution monitoring system comprising:
   a processor; and
   a computer-readable medium including instructions thereon that, when executed by the processor, cause the processor to perform operations including:
      receiving a first plurality of data points of a stream of data points at a first data resolution, each data point in the stream of data points including a data point value and an associated time stamp, wherein the first data resolution corresponds to an inter-arrival time between data points in the first plurality of data points;
      setting an output resolution for an output data stream to a first value;
      generating a first set of output data points for the output data stream based upon the data points in the first plurality of data points received via the stream of data points;
      transmitting the first set of output data points for the output data stream according to the output resolution set to the first value, wherein the first value represents a time between transmitting data points in the first set of output data points;
      based upon monitoring of the stream of data points, detecting a change in data resolution of data points in the stream of data points from the first data resolution to a second data resolution that is different from the first data resolution;
      responsive to detecting the change in data resolution of data points in the stream of data points from the first data resolution to the second data resolution, setting the output resolution for the output data stream to a second value different from the first value;
      generating a second set of output data points for the output data stream based upon a second plurality of data points of the stream of data points; and
      transmitting the second set of output data points for the output data stream according to the output resolution set to the second value, wherein the second value represents a time between transmitting data points in the second set of output data points.

9. The data resolution monitoring system of claim 8, wherein the monitoring of the stream of data points comprises:
   initializing a majority symbol object that includes a bitset specifying the first data resolution of the stream of data points; and
   updating a bit in the bitset of the majority symbol object specifying that the change in data resolution for the stream of data points from the first data resolution to the second data resolution has been detected.

10. The data resolution monitoring system of claim 8, wherein the monitoring of the stream of data points comprises:
    periodically deriving a resolution of received data points of the stream of data points; and
    modify a rolling sum tracking instances of derived resolutions of the stream of data points, wherein detecting the change in data resolution includes determining that a new resolution has a greater number of tracked instances in the rolling sum than that of the first data resolution.

11. The data resolution monitoring system of claim 8, wherein the second value is determined based on one or more dynamic limiters specifying a range of computing resources to be dedicated to determining the second value as specified by the second data resolution.

12. The data resolution monitoring system of claim 8, wherein detecting the change in data resolution of data points in the stream of data points from the first data resolution to the second data resolution comprises:
    determining that the stream of data points exhibits a series of resolution intervals across a range of interval values specifying that the stream of data points comprises aperiodic data; and
    deriving a most frequently identified resolution interval of the series of resolution intervals across the range of interval values, wherein the second data resolution comprises the most frequently identified resolution interval.

13. The data resolution monitoring system of claim 8, wherein the operations further include:

receiving, by one or more ingestion subsystems of the data resolution monitoring system, multiple streams of data points, wherein the first plurality of data points are included in the multiple streams of data points, and each of the multiple streams of data points corresponding to different input resolutions of a set of input resolutions.

14. The data resolution monitoring system of claim 13, wherein the operations further include:

forwarding the multiple streams of data points to an output subsystem via one or more data blocks, wherein generating the second set of output data points and transmitting of the second set of output data points according to the output resolution set to the second value are performed by the output subsystem.

15. The data resolution monitoring system of claim 14, wherein output data points are generated at the output subsystem based upon the data points in each of the multiple streams of data points at each of a set of input resolutions.

16. A non-transitory computer-readable medium including stored thereon a sequence of instructions that, when executed by a processor causes the processor to perform operations comprising:

receiving multiple streams of data points, each data point in each stream of data points including a data point value and an associated time stamp, wherein each of the multiple streams of data points has a data resolution corresponding to an inter-arrival time between data points in the each of the multiple streams of data points;

deriving a first set of input resolution values based on data resolutions for each of multiple portions of the multiple streams of data points, where each of the multiple portions correspond to data blocks;

setting an output resolution for an output data stream to a first value based on the first set of input resolution values;

generating a first set of output data points for the output data stream based upon the data points in each of the multiple streams of data points at each of the first set of input resolution values;

transmitting the first set of output data points for the output data stream according to the first value, wherein the first value represents a time between transmitting data points in the first set of output data points;

based upon monitoring the multiple streams of data points, detecting a second set of input resolution values that are different from the first set of input resolution values;

responsive to detecting the second set of input resolution values, setting the output resolution for the output data stream to a second value different from the first value;

generating a second set of output data points for the output data steam based upon data points in a second plurality of data points of the multiple streams of data points; and transmitting the second set of output data points for the output data steam according to the output resolution set to the second value, wherein the second value represents a time between transmitting data points in the second set of output data points.

17. The non-transitory computer-readable medium of claim 16, wherein the monitoring the multiple streams of data points comprises:

initializing a majority symbol object that includes a bitset specifying the data resolutions of the multiple streams of data points; and updating a bit in the bitset of the majority symbol object specifying that detection of the data resolution for the streams of data points changing from the first set of input resolutions to the second set of input resolutions has been detected.

18. The non-transitory computer-readable medium of claim 16, wherein the monitoring of the stream of data points comprises:

periodically deriving resolutions of received data points of the multiple streams of data points; and modifying a rolling sum tracking instances of derived resolutions of the multiple streams of data points, wherein detecting the second set of input resolution values that are different from the first set of input resolution values includes determining that a new resolution has a greater number of tracked instances in the rolling sum than that of the data resolution.

19. The non-transitory computer-readable medium of claim 16, wherein the second value is determined based on one or more dynamic limiters specifying a range of computing resources to be dedicated to determining the second value.

20. The non-transitory computer-readable medium of claim 16, wherein detecting the second set of input resolution values that are different from the first set of input resolution values comprises:

determining that the multiple streams of data points exhibits a series of resolution intervals across a range of interval values specifying that the streams of data points comprise aperiodic data; and deriving a most frequently identified resolution interval of the series of resolution intervals across the range of interval values, wherein the second value comprises the most frequently identified resolution interval.

* * * * *